United States Patent
Cooper et al.

(10) Patent No.: US 9,541,179 B2
(45) Date of Patent: Jan. 10, 2017

(54) TRANSMISSION AND DRIVELINE HAVING A TILTING BALL VARIATOR CONTINUOUSLY VARIABLE TRANSMISSION

(71) Applicant: DANA LIMITED, Maumee, OH (US)

(72) Inventors: Kenneth E. Cooper, Toledo, OH (US); Mark R. J. Versteyhe, Oostkamp (BE)

(73) Assignee: Dana Limited, Maumee, OH (US)

( * ) Notice: Subject to any disclaimer, the term of this patent is extended or adjusted under 35 U.S.C. 154(b) by 0 days.

(21) Appl. No.: 14/378,750

(22) PCT Filed: Feb. 14, 2013

(86) PCT No.: PCT/US2013/026037
§ 371 (c)(1),
(2) Date: Aug. 14, 2014

(87) PCT Pub. No.: WO2013/123117
PCT Pub. Date: Aug. 22, 2013

(65) Prior Publication Data
US 2016/0033021 A1    Feb. 4, 2016

Related U.S. Application Data

(60) Provisional application No. 61/598,963, filed on Feb. 15, 2012.

(51) Int. Cl.
*F16H 37/02*    (2006.01)
*F16H 37/08*    (2006.01)
(Continued)

(52) U.S. Cl.
CPC ............ *F16H 37/022* (2013.01); *F16H 15/28* (2013.01); *F16H 15/50* (2013.01); *F16H 37/086* (2013.01);
(Continued)

(58) Field of Classification Search
CPC ....................................................... F16H 15/26
See application file for complete search history.

(56) References Cited

U.S. PATENT DOCUMENTS 1,063,244 A    6/1913    Dieterich
1,215,969 A    2/1917    Thomas
(Continued)

FOREIGN PATENT DOCUMENTS

AU    2011224083 A1    10/2011
CN    101479503 A    7/2009
(Continued)

OTHER PUBLICATIONS

U.S. Appl. No. 14/017,054 Office Action dated Dec. 12, 2014.
(Continued)

*Primary Examiner* — Justin Holmes
*Assistant Examiner* — Timothy M Hannon
(74) *Attorney, Agent, or Firm* — Marshall & Melhorn, LLC (57) ABSTRACT

A transmission is provided. The transmission includes an input portion drivingly engaged with a power source, a planetary gear, a continuously variable variator, and a clutching device. The planetary gear arrangement has a portion drivingly engaged with the input portion. The continuously variable variator includes a portion which is drivingly engaged with at least one of the planetary gear arrangement and the input portion. The clutching device may be selectively drivingly engaged with a portion of the continuously variable variator. The clutching device and the planetary gear arrangement facilitate a transition between at least two operating modes of the continuously variable variator.

11 Claims, 3 Drawing Sheets

(51) Int. Cl.
*F16H 15/28* (2006.01)
*F16H 15/50* (2006.01)
*F16H 15/52* (2006.01)
*F16H 15/40* (2006.01)

(52) U.S. Cl.
CPC .............. *F16H 15/40* (2013.01); *F16H 15/503* (2013.01); *F16H 15/52* (2013.01); *F16H 2037/0886* (2013.01); *F16H 2200/2005* (2013.01)

(56) References Cited

U.S. PATENT DOCUMENTS

| | | |
|---|---|---|
| 1,526,140 A | 2/1925 | Gruver |
| 2,019,006 A | 10/1935 | Ferrari |
| 2,060,884 A | 11/1936 | Madle |
| 2,148,759 A | 2/1939 | Grand |
| 2,405,201 A | 8/1946 | Franck |
| 2,660,897 A | 12/1953 | Neidhart et al. |
| 2,729,118 A | 1/1956 | Emslie |
| 2,931,235 A | 4/1960 | Hayward |
| 3,203,278 A | 8/1965 | General |
| 3,376,633 A | 4/1968 | Wesley |
| 3,407,687 A | 10/1968 | Hayashi |
| 3,470,720 A | 10/1969 | Eklund et al. |
| 3,505,718 A | 4/1970 | Carl |
| 3,583,060 A | 6/1971 | Maurice |
| 3,688,600 A | 9/1972 | Allan |
| 3,765,270 A * | 10/1973 | Lemieux .............. F16H 37/086 475/115 |
| 3,774,280 A | 11/1973 | Eklund et al. |
| 3,831,245 A | 8/1974 | Amos |
| 3,894,559 A | 7/1975 | DePuy |
| 4,046,988 A | 9/1977 | Okuda et al. |
| 4,056,988 A | 11/1977 | Kubo et al. |
| 4,187,709 A | 2/1980 | Legate et al. |
| 4,226,140 A | 10/1980 | Gaasenbeek |
| 4,333,358 A | 6/1982 | Grattapaglia |
| 4,344,336 A | 8/1982 | Carriere |
| 4,368,572 A | 1/1983 | Kanazawa et al. |
| 4,464,952 A | 8/1984 | Stubbs |
| 4,693,134 A | 9/1987 | Kraus |
| 4,731,044 A | 3/1988 | Mott |
| 4,756,211 A | 7/1988 | Fellows |
| 4,784,017 A | 11/1988 | Johnshoy |
| 4,856,371 A | 8/1989 | Kemper |
| 4,856,374 A | 8/1989 | Kreuzer |
| 4,950,208 A | 8/1990 | Tomlinson |
| 4,963,122 A | 10/1990 | Ryan |
| 4,963,124 A | 10/1990 | Takahashi et al. |
| 5,109,962 A | 5/1992 | Sato |
| 5,217,412 A | 6/1993 | Indlekofer et al. |
| 5,230,670 A | 7/1993 | Hibi |
| 5,238,460 A | 8/1993 | Esaki et al. |
| 5,318,486 A | 6/1994 | Lutz |
| 5,390,759 A | 2/1995 | Gollner |
| 5,401,221 A | 3/1995 | Fellows et al. |
| 5,520,588 A | 5/1996 | Hall, III |
| 5,527,231 A | 6/1996 | Seidel et al. |
| 5,577,423 A | 11/1996 | Mimura |
| 5,599,251 A | 2/1997 | Beim et al. |
| 5,659,956 A | 8/1997 | Braginsky et al. |
| 5,683,322 A | 11/1997 | Meyerle |
| 5,726,353 A | 3/1998 | Matsuda et al. |
| 5,730,678 A | 3/1998 | Larkin |
| 5,766,105 A | 6/1998 | Fellows et al. |
| 5,776,028 A | 7/1998 | Matsuda et al. |
| 5,800,303 A | 9/1998 | Benford |
| 5,860,888 A | 1/1999 | Lee |
| 5,915,801 A | 6/1999 | Taga et al. |
| 5,961,415 A | 10/1999 | Justice et al. |
| 5,971,883 A | 10/1999 | Klemen |
| 5,996,226 A | 12/1999 | Gibbs |
| 6,009,365 A | 12/1999 | Takahara et al. |
| 6,036,616 A | 3/2000 | McCarrick et al. |
| 6,045,477 A | 4/2000 | Schmidt |
| 6,053,839 A | 4/2000 | Baldwin et al. |
| 6,059,685 A | 5/2000 | Hoge et al. |
| 6,071,208 A | 6/2000 | Koivunen |
| 6,080,080 A | 6/2000 | Bolz et al. |
| 6,083,135 A | 7/2000 | Baldwin et al. |
| 6,086,504 A | 7/2000 | Illerhaus |
| 6,089,287 A | 7/2000 | Welsh et al. |
| 6,095,942 A | 8/2000 | Yamaguchi et al. |
| 6,155,951 A | 12/2000 | Kuhn et al. |
| 6,217,474 B1 | 4/2001 | Ross et al. |
| 6,251,038 B1 | 6/2001 | Ishikawa et al. |
| 6,273,838 B1 | 8/2001 | Park |
| 6,342,026 B1 | 1/2002 | Takagi et al. |
| 6,358,178 B1 | 3/2002 | Wittkopp |
| 6,371,880 B1 | 4/2002 | Kam |
| 6,405,117 B1 | 6/2002 | Walenty et al. |
| 6,481,258 B1 | 11/2002 | Belinky |
| 6,554,735 B2 | 4/2003 | Kanazawa |
| 6,558,285 B1 | 5/2003 | Sieber |
| 6,585,619 B2 | 7/2003 | Henzler |
| 6,609,994 B2 | 8/2003 | Muramoto |
| 6,632,157 B1 | 10/2003 | Gierling et al. |
| 6,641,497 B2 | 11/2003 | Deschamps et al. |
| 6,645,106 B2 | 11/2003 | Goo et al. |
| 6,689,012 B2 | 2/2004 | Miller et al. |
| 6,705,964 B2 | 3/2004 | Nagai et al. |
| 6,719,659 B2 | 4/2004 | Geiberger et al. |
| 6,723,016 B2 | 4/2004 | Sumi |
| 6,726,590 B2 | 4/2004 | Henzler et al. |
| 6,733,412 B2 | 5/2004 | Kumagai et al. |
| 6,752,696 B2 | 6/2004 | Murai et al. |
| 6,793,603 B2 | 9/2004 | Teraoka et al. |
| 6,849,020 B2 | 2/2005 | Sumi |
| 6,866,606 B2 | 3/2005 | Ooyama |
| 6,949,045 B2 | 9/2005 | Wafzig et al. |
| 6,979,275 B2 | 12/2005 | Hiraku et al. |
| 6,986,725 B2 | 1/2006 | Morscheck |
| 7,033,298 B2 | 4/2006 | Usoro et al. |
| 7,074,154 B2 | 7/2006 | Miller |
| 7,086,981 B2 | 8/2006 | Ali et al. |
| 7,104,917 B2 | 9/2006 | Klemen et al. |
| 7,128,681 B2 | 10/2006 | Sugino et al. |
| 7,160,220 B2 | 1/2007 | Shinojima et al. |
| 7,186,199 B1 | 3/2007 | Baxter, Jr. |
| 7,217,214 B2 | 5/2007 | Morscheck et al. |
| 7,234,543 B2 | 6/2007 | Schaaf |
| 7,288,044 B2 | 10/2007 | Gumpoltsberger |
| 7,335,126 B2 | 2/2008 | Tsuchiya et al. |
| 7,347,801 B2 | 3/2008 | Guenter et al. |
| 7,396,309 B2 | 7/2008 | Heitz et al. |
| 7,431,677 B2 | 10/2008 | Miller et al. |
| 7,470,210 B2 | 12/2008 | Miller et al. |
| 7,473,202 B2 | 1/2009 | Morscheck et al. |
| 7,485,069 B2 | 2/2009 | Jang et al. |
| 7,497,798 B2 | 3/2009 | Kim |
| 7,588,514 B2 | 9/2009 | McKenzie et al. |
| 7,637,838 B2 | 12/2009 | Gumpoltsberger |
| 7,672,770 B2 | 3/2010 | Inoue et al. |
| 7,686,729 B2 | 3/2010 | Miller et al. |
| 7,717,815 B2 | 5/2010 | Tenberge |
| 7,727,107 B2 | 6/2010 | Miller |
| 7,780,566 B2 | 8/2010 | Seo |
| 7,874,153 B2 | 1/2011 | Behm |
| 7,878,935 B2 | 2/2011 | Lahr |
| 7,951,035 B2 | 5/2011 | Platt |
| 7,980,972 B1 | 7/2011 | Starkey et al. |
| 8,029,401 B2 | 10/2011 | Johnson |
| 8,052,569 B2 | 11/2011 | Tabata et al. |
| 8,062,175 B2 | 11/2011 | Krueger et al. |
| 8,066,614 B2 | 11/2011 | Miller et al. |
| 8,142,323 B2 | 3/2012 | Tsuchiya et al. |
| 8,226,518 B2 | 7/2012 | Parraga |
| 8,257,216 B2 | 9/2012 | Hoffman |
| 8,257,217 B2 | 9/2012 | Hoffman |
| 8,287,414 B2 | 10/2012 | Weber et al. |
| 8,313,404 B2 | 11/2012 | Carter et al. |
| 8,376,903 B2 | 2/2013 | Pohl et al. |
| 8,382,636 B2 | 2/2013 | Shiina et al. |

(56) References Cited

U.S. PATENT DOCUMENTS

| | | | |
|---|---|---|---|
| 8,447,480 B2 | 5/2013 | Usukura |
| 8,469,856 B2 | 6/2013 | Thomassy |
| 8,545,368 B1 | 10/2013 | Davis et al. |
| 8,594,867 B2 | 11/2013 | Heap et al. |
| 8,622,871 B2 | 1/2014 | Hoff |
| 8,639,419 B2 | 1/2014 | Roli et al. |
| 8,668,614 B2 | 3/2014 | Sherrill et al. |
| 8,678,975 B2 | 3/2014 | Koike |
| 8,870,711 B2 | 10/2014 | Pohl et al. |
| 8,888,643 B2 | 11/2014 | Lohr et al. |
| 8,926,468 B2 | 1/2015 | Versteyhe et al. |
| 8,986,150 B2 | 3/2015 | Versteyhe et al. |
| 9,114,799 B2 | 8/2015 | Tsukamoto et al. |
| 9,156,463 B2 | 10/2015 | Legner et al. |
| 2002/0004438 A1 | 1/2002 | Toukura et al. |
| 2002/0094911 A1 | 7/2002 | Haka |
| 2002/0169048 A1 | 11/2002 | Henzler et al. |
| 2003/0060318 A1 | 3/2003 | Sumi |
| 2003/0181280 A1 | 9/2003 | Elser et al. |
| 2003/0200783 A1 | 10/2003 | Shai |
| 2003/0213125 A1 | 11/2003 | Chiuchang |
| 2003/0216121 A1 | 11/2003 | Yarkosky |
| 2003/0228952 A1 | 12/2003 | Joe et al. |
| 2004/0058769 A1 | 3/2004 | Larkin |
| 2004/0061639 A1 | 4/2004 | Voigtlaender et al. |
| 2004/0166984 A1 | 8/2004 | Inoue |
| 2004/0167391 A1 | 8/2004 | Solar et al. |
| 2004/0171452 A1 | 9/2004 | Miller et al. |
| 2005/0102082 A1 | 5/2005 | Joe et al. |
| 2005/0137046 A1 | 6/2005 | Miller et al. |
| 2005/0153810 A1 | 7/2005 | Miller et al. |
| 2006/0094515 A1 | 5/2006 | Szuba et al. |
| 2006/0234822 A1 | 10/2006 | Morscheck et al. |
| 2006/0276294 A1 | 12/2006 | Coffey et al. |
| 2007/0021259 A1 | 1/2007 | Tenberge |
| 2007/0032327 A1 | 2/2007 | Raghavan et al. |
| 2007/0042856 A1 | 2/2007 | Greenwood |
| 2007/0072732 A1 | 3/2007 | Klemen |
| 2007/0096556 A1 | 5/2007 | Kokubo et al. |
| 2007/0270270 A1 | 11/2007 | Miller et al. |
| 2007/0275808 A1 | 11/2007 | Iwanaka et al. |
| 2008/0039273 A1 | 2/2008 | Smithson et al. |
| 2008/0103002 A1 | 5/2008 | Holmes |
| 2008/0121487 A1 | 5/2008 | Miller et al. |
| 2008/0185201 A1 | 8/2008 | Bishop |
| 2009/0017959 A1 | 1/2009 | Triller |
| 2009/0048054 A1 | 2/2009 | Tsuchiya et al. |
| 2009/0062064 A1 | 3/2009 | Kamada et al. |
| 2009/0112424 A1 | 4/2009 | Dahl et al. |
| 2009/0132135 A1* | 5/2009 | Quinn, Jr. ............ F16H 61/6649 701/55 |
| 2009/0221391 A1 | 9/2009 | Bazyn et al. |
| 2009/0221393 A1 | 9/2009 | Kassler |
| 2009/0286651 A1 | 11/2009 | Tanaka et al. |
| 2009/0312137 A1 | 12/2009 | Rohs et al. |
| 2010/0056322 A1 | 3/2010 | Thomassy |
| 2010/0093476 A1 | 4/2010 | Carter et al. |
| 2010/0093479 A1 | 4/2010 | Carter et al. |
| 2010/0106386 A1 | 4/2010 | Krasznai et al. |
| 2010/0113211 A1 | 5/2010 | Schneider et al. |
| 2010/0137094 A1 | 6/2010 | Pohl |
| 2010/0141193 A1 | 6/2010 | Rotondo et al. |
| 2010/0244755 A1 | 9/2010 | Kinugasa et al. |
| 2010/0267510 A1 | 10/2010 | Nichols et al. |
| 2010/0282020 A1 | 11/2010 | Greenwood et al. |
| 2010/0304915 A1 | 12/2010 | Lahr |
| 2010/0310815 A1 | 12/2010 | Mendonca et al. |
| 2011/0015021 A1 | 1/2011 | Maguire et al. |
| 2011/0034284 A1 | 2/2011 | Pohl et al. |
| 2011/0152031 A1 | 6/2011 | Schoolcraft |
| 2011/0165982 A1 | 7/2011 | Hoffman et al. |
| 2011/0165985 A1 | 7/2011 | Hoffman et al. |
| 2011/0165986 A1 | 7/2011 | Hoffman et al. |
| 2011/0165987 A1 | 7/2011 | Hoffman et al. |
| 2011/0230297 A1 | 9/2011 | Shiina et al. |
| 2011/0300954 A1 | 12/2011 | Szuba et al. |
| 2011/0319222 A1 | 12/2011 | Ogawa et al. |
| 2012/0024991 A1 | 2/2012 | Pilch et al. |
| 2012/0035016 A1 | 2/2012 | Miller et al. |
| 2012/0040794 A1 | 2/2012 | Schoolcraft |
| 2012/0122624 A1 | 5/2012 | Hawkins, Jr. et al. |
| 2012/0142477 A1 | 6/2012 | Winter |
| 2012/0165154 A1 | 6/2012 | Wittkopp et al. |
| 2012/0231925 A1 | 9/2012 | Shiina et al. |
| 2012/0244990 A1 | 9/2012 | Ogawa et al. |
| 2012/0309579 A1 | 12/2012 | Miller et al. |
| 2013/0096797 A1 | 4/2013 | Whitney et al. |
| 2013/0130859 A1 | 5/2013 | Lundberg et al. |
| 2013/0133965 A1 | 5/2013 | Books |
| 2013/0184115 A1* | 7/2013 | Urabe .................. B62M 11/14 475/193 |
| 2013/0190131 A1 | 7/2013 | Versteyhe et al. |
| 2013/0226416 A1 | 8/2013 | Seipold et al. |
| 2013/0303325 A1 | 11/2013 | Carey et al. |
| 2013/0304344 A1 | 11/2013 | Abe |
| 2013/0338888 A1 | 12/2013 | Long et al. |
| 2014/0194242 A1 | 7/2014 | Cooper |
| 2014/0194243 A1 | 7/2014 | Versteyhe et al. |
| 2014/0223901 A1 | 8/2014 | Versteyhe et al. |
| 2014/0274536 A1 | 9/2014 | Versteyhe et al. |
| 2014/0274540 A1 | 9/2014 | Schoolcraft |
| 2014/0274552 A1 | 9/2014 | Frink et al. |
| 2014/0329637 A1 | 11/2014 | Thomassy et al. |
| 2015/0024899 A1 | 1/2015 | Phillips |
| 2015/0111683 A1 | 4/2015 | Versteyhe |
| 2015/0111693 A1 | 4/2015 | Wang et al. |
| 2015/0198246 A1 | 7/2015 | Callaway et al. |
| 2015/0204429 A1 | 7/2015 | Versteyhe |
| 2015/0204430 A1 | 7/2015 | Versteyhe |
| 2015/0226294 A1 | 8/2015 | Ziech |
| 2015/0226298 A1 | 8/2015 | Versteyhe |
| 2015/0226299 A1 | 8/2015 | Cooper |
| 2015/0252881 A1 | 9/2015 | Versteyhe |
| 2015/0354676 A1 | 12/2015 | Versteyhe et al. |
| 2016/0047448 A1 | 2/2016 | Versteyhe et al. |
| 2016/0109001 A1 | 4/2016 | Schoolcraft |
| 2016/0123438 A1 | 5/2016 | Ziech et al. |
| 2016/0131235 A1 | 5/2016 | Phillips |
| 2016/0195173 A1 | 7/2016 | Versteyhe et al. |
| 2016/0195177 A1 | 7/2016 | Versteyhe et al. |

FOREIGN PATENT DOCUMENTS

| | | |
|---|---|---|
| CN | 101617146 A | 12/2009 |
| CN | 102297255 A | 12/2011 |
| CN | 102338208 A | 2/2012 |
| CN | 202392067 U | 8/2012 |
| DE | 1237380 B | 3/1967 |
| DE | 3245045 A1 | 6/1984 |
| DE | 102005010751 | 9/2006 |
| EP | 0210053 A2 | 7/1985 |
| EP | 0156936 A1 | 10/1985 |
| EP | 1061288 | 12/2000 |
| EP | 1174645 A2 | 1/2002 |
| EP | 2113056 | 7/2012 |
| FR | 796188 A | 3/1936 |
| FR | 1030702 | 6/1953 |
| FR | 1472282 A | 3/1967 |
| FR | 2185076 A5 | 12/1973 |
| FR | 2280451 A1 | 2/1976 |
| FR | 2918433 | 1/2009 |
| GB | 1127825 A | 9/1968 |
| GB | 2196892 A | 5/1988 |
| GB | 2248895 A2 | 4/1992 |
| JP | H-09-119506 | 5/1997 |
| JP | 2008-180214 | 8/2008 |
| JP | 2011153583 A | 8/2011 |
| WO | WO2006/002457 | 1/2006 |
| WO | WO2006/041718 | 4/2006 |
| WO | WO-2006109158 A1 | 10/2006 |
| WO | WO2007/046722 | 4/2007 |
| WO | WO2007/051827 | 5/2007 |
| WO | WO2008/103543 | 8/2008 |
| WO | WO-2008101070 A2 | 8/2008 |

(56) References Cited

FOREIGN PATENT DOCUMENTS

| | | |
|---|---|---|
| WO | WO2011/011991 | 2/2011 |
| WO | WO2012/008884 | 1/2012 |
| WO | WO-2012177187 A1 | 12/2012 |
| WO | WO2013/109723 | 7/2013 |
| WO | WO2013/123117 | 8/2013 |
| WO | WO2014/039438 | 3/2014 |
| WO | WO2014/039439 | 3/2014 |
| WO | WO2014/039440 | 3/2014 |
| WO | WO2014/039447 | 3/2014 |
| WO | WO2014/039448 | 3/2014 |
| WO | WO2014/039708 | 3/2014 |
| WO | WO2014/039713 | 3/2014 |
| WO | WO2014/039846 | 3/2014 |
| WO | WO2014/039900 | 3/2014 |
| WO | WO2014/039901 | 3/2014 |
| WO | WO2014/078583 | 5/2014 |
| WO | WO-2014124291 A1 | 8/2014 |
| WO | WO2014/151889 | 9/2014 |
| WO | WO2014/159755 | 10/2014 |
| WO | WO2014/159756 | 10/2014 |
| WO | WO2014/165259 | 10/2014 |
| WO | WO2014/179717 | 11/2014 |
| WO | WO2014/179719 | 11/2014 |
| WO | WO2014/186732 | 11/2014 |
| WO | WO2014/197711 | 12/2014 |
| WO | WO-2015059601 A1 | 4/2015 |
| WO | WO-2015073883 A1 | 5/2015 |
| WO | WO-2015073887 A1 | 5/2015 |
| WO | WO-2015073948 A2 | 5/2015 |
| WO | WO-2015195759 A2 | 12/2015 |
| WO | WO-2015200769 A1 | 12/2015 |
| WO | WO-2016094254 A1 | 6/2016 |

OTHER PUBLICATIONS

PCT/US2014/065909 International Search Report and Written Opinion dated Feb. 19, 2015.
Co-pending U.S. Appl. No. 14/542,336, filed Nov. 14, 2014.
Co-pending U.S. Appl. No. 14/622,038, filed Feb. 13, 2015.
PCT/US2013/057838 International Preliminary Report on Patentability dated Mar. 19, 2015.
PCT/US2013/057868 International Preliminary Report on Patentability dated Mar. 19, 2015.
PCT/US2013/058309 International Preliminary Report on Patentability dated Mar. 19, 2015.
PCT/US2013/058318 International Preliminary Report on Patentability dated Mar. 19, 2015.
PCT/US2013/058545 International Preliminary Report on Patentability dated Mar. 19, 2015.
PCT/US2013/058615 International Preliminary Report on Patentability dated Mar. 19, 2015.
PCT/US2013/058616 International Preliminary Report on Patentability dated Mar. 19, 2015.
U.S. Appl. No. 13/743,951 Office Action dated Mar. 18, 2015.
PCT/US2014/65792 International Search Report and Written Opinion dated Apr. 9, 2015.
PCT/US2014/65796 International Search Report and Written Opinion dated Apr. 9, 2015.
Co-pending U.S. Appl. No. 14/925,813, filed Oct. 28, 2015.
PCT/US2014/025001 International Preliminary Report on Patent ability dated Sep. 24, 2015.
PCT/US2014/025004 International Preliminary Report on Patentability dated Oct. 1, 2015.
PCT/US2014/025005 International Preliminary Report on Patentability dated Oct. 1, 2015.
PCT/US2014/026619 International Preliminary Report on Patentability dated Sep. 24, 2015.
PCT/US2014/036621 International Preliminary Report on Patentability dated Nov. 12, 2015.
PCT/US2014/036623 International Preliminary Report on Patentability dated Nov. 12, 2015.
PCT/US2014/038439 International Preliminary Report on Patentability dated Nov. 26, 2015.
PCT/US2014/065796 International Preliminary Report on Patentability dated Nov. 6, 2015.
PCT/US2015/37916 International Search Report and Written Opinion dated Sep. 29, 2015.
U.S. Appl. No. 14/175,584 Office Action dated Dec. 3, 2015.
U.S. Appl. No. 14/210,130 Office Action dated Nov. 20, 2015.
U.S. Appl. No. 14/426,139 Office Action dated Oct. 6, 2015.
U.S. Appl. No. 14/542,336 Office Action dated Nov. 25, 2015.
PCT/US2014/065909 Written Opinion dated Dec. 11, 2015.
PCT/US2014/041124 International Preliminary Report on Patentability dated Dec. 17, 2015.
PCT/US2015/36170 International Search Report and Written Opinion dated Dec. 17, 2015.
PCT/US2015/64087 International Search Report and Written Opinion dated Feb. 11, 2016.
U.S. Appl. No. 13/743,951 Office Action dated Jan. 21, 2016.
PCT/US2014/038439 International Search Report and Written Opinion dated Sep. 30, 2014.
PCT/US2014/041124 International Search Report and Written Opinion dated Oct. 15, 2014.
U.S. Appl. No. 61/819,414, filed May 3, 2013, Phillips et al.
Fallbrook Technologies. 'NuVinci® Technology', Feb. 26, 2013; [retrieved on Jun. 5, 2014]. Retrieved from internet: <URL: https://web.archive.org/web/20130226233109/http://www.fallbrooktech.com/nuvinci-technology.
Moore et al, A Three Revolute Cobot Using CVTs in Parallel, Proceedings of IMECE, 1999, 6 pgs.
PCT/US2013/021890 International Search Report dated Apr. 10, 2013.
PCT/US2013/026037 International Preliminary Report on Patentability dated Aug. 28, 2014.
PCT/US2013/026037 International Search Report dated Jul. 15, 2013.
PCT/US2013/057837 International Search Report and Written Opinion dated Mar. 31, 2014.
PCT/US2013/057866 International Search Report dated Feb. 11, 2014.
PCT/US2013/058309 International Search Report and Written Opinion dated Feb. 11, 2014.
PCT/US2013/058318 International Search Report and Written Opinion dated Feb. 11, 2014.
PCT/US2013/058545 International Search Report and Written Opinion dated Feb. 19, 2014.
PCT/US2013/058616 International Search Report and Written Opinion dated Feb. 11, 2014.
PCT/US2013/070177 International Search Report and Written Opinion dated Apr. 14, 2014.
PCT/US2013/57838 International Search Report and Written Opinion dated Jan. 17, 2014.
PCT/US2013/57839 International Search Report and Written Opinion dated Feb. 6, 2014.
PCT/US2013/57868 International Search Report and Written Opinion dated Apr. 9, 2014.
PCT/US2013/58615 International Search Report and Written Opinion dated Feb. 11, 2014.
PCT/US2014/25001 International Search Report and Written Opinion dated Jul. 14, 2014.
PCT/US2014/25004 International Search Report and Written Opinion dated Jul. 14, 2014.
PCT/US2014/25005 International Search Report and Written Opinion dated Jul. 14, 2014.
PCT/US2014/036623 International Search Report and Written Opinion dated Sep. 4, 2014.
PCT/US2014/26619 International Search Report and Written Opinion dated Sep. 9, 2014.
PCT/US2014/036621 International Search Report and Written Opinion dated Sep. 4, 2014.
U.S. Appl. No. 14/017,054 Office Action dated Aug. 27, 2014.
Wong. The Temple of VTEC Asia Special Focus on the Multimatic Transmission. Temple of VTEC Asia. 2000.

(56) References Cited

OTHER PUBLICATIONS

PCT/US2013/021890 International Preliminary Report on Patentability dated Jul. 31, 2014.
PCT/US2013/057837 International Preliminary Report on Patentability dated Mar. 19, 2015.
PCT/US2013/057839 International Preliminary Report on Patentability dated Mar. 19, 2015.
PCT/US2013/057866 International Preliminary Report on Patentability dated Mar. 19, 2015.
PCT/US2013/070177 International Preliminary Report on Patentability dated May 28, 2015.
PCT/US2014/015352 International Search Report and Written Opinion dated May 27, 2014.
U.S. Appl. No. 13/743,951 Office Action dated Aug. 19, 2015.
U.S. Appl. No. 14/175584 Office Action dated Apr. 2, 2015.
U.S. Appl. No. 60/616399 filed on Oct. 5, 2004.
PCT/US2014/065792 International Preliminary Report on Patentability dated Jun. 2, 2016.
PCT/US2014/065909 Written Opinion dated Jun. 6, 2016.
PCT/US2016/027496 International Search Report and Written Opinion dated Jul. 8, 2016.
U.S. Appl. No. 14/210,130 Office Action dated Jun. 7, 2016.
U.S. Appl. No. 14/425,598 Office Action dated Jun. 14, 2016.
U.S. Appl. No. 14/425,600 Office Action dated May 16, 2016.
U.S. Appl. No. 14/425,842 Office Action dated Jul. 1, 2016.
U.S. Appl. No. 15/067,752 Office Action dated Jun. 30, 2016.
Co-pending U.S. Appl. No. 15/209,487, filed Jul. 13, 2016.
Co-pending U.S. Appl. No. 15/215,179, filed Jul. 20, 2016.
U.S. Appl. No. 14/334,538 Office Action dated Jul. 29, 2016.
Co-pending U.S. Appl. No. 15/260,472, filed Sep. 9, 2016.
Co-pending U.S. Appl. No. 15/265,163, filed Sep. 14, 2016.
Co-pending U.S. Appl. No. 15/265,226, filed Sep. 14, 2016.
PCT/US2016/038064 International Search Report and Written Opinion dated Sep. 7, 2016.
PCT/US2016/045857 International Search Report and Written Opinion dated Oct. 13, 2016.

* cited by examiner

TRANSMISSION AND DRIVELINE HAVING A TILTING BALL VARIATOR CONTINUOUSLY VARIABLE TRANSMISSION

CLAIM OF PRIORITY

This application is filed pursuant to 35 U.S.C. §371 as a United States National Phase Application of International Application No. PCT/US2013/026037, filed on Feb. 14, 2013, entitled "TRANSMISSION AND DRIVELINE HAVING A TILTING BALL VARIATOR CONTINUOUSLY VARIABLE TRANSMISSION," which claims the benefit of U.S. Provisional Application No. 61/598,963, filed Feb. 15, 2012, entitled "TRANSMISSION AND DRIVELINE HAVING A TILTING BALL VARIATOR CONTINUOUSLY VARIABLE TRANSMISSION" which applications are incorporated herein by reference.

BACKGROUND OF THE INVENTION

A vehicle having a driveline including a continuously variable transmission has many advantages over vehicles not including the continuously variable transmission. The vehicle having a driveline including a continuously variable transmission allows an operator of the vehicle or a control system of the vehicle to vary a drive ratio in a stepless manner. Such functionality permits a power source of the vehicle, such as an internal combustion engine, to operate at its most efficient rotational speed.

Vehicle packaging requirements and vehicle cost are an ever increasing concern for modern consumers and manufacturers. A hydraulic system, a complex arrangement of gears and clutches, and expensive belts or rollers may form a portion of a conventional multi-speed automatic transmission or a continuously variable transmission. As a result of these concerns, multi-speed automatic transmissions and continuously variable transmissions commonly used in vehicles are typically complex, bulky, and costly to service.

Continuously variable transmissions known in the art tend to have limited ratio ranges. In a variable diameter pulley style continuously variable transmission, a ration range is limited by a ratio between the smallest and largest diameters in which the variable diameter pulleys may be configured in. Further, because all of the power transferred through the continuously variable transmission must pass through a flexible belt, the variable diameter pulley style continuously variable transmission is typically limited to transmitting smaller amounts of power. Such designs limit the vehicle applications the continuously variable transmissions may be incorporated in.

It would be advantageous to develop a driveline including a continuously variable transmission that is inexpensive, compact, may be configured for a wide range of torque distributions, and able to adjust a drive ratio.

SUMMARY OF THE INVENTION

Presently provided by the invention, a driveline including a continuously variable transmission that is inexpensive, compact, may be configured for a wide range of torque distributions, and able to adjust a drive ratio has surprisingly been discovered.

In one embodiment, the present invention is directed to a transmission for a vehicle. The transmission includes an input portion drivingly engaged with a power source, a planetary gear, a continuously variable variator, and a clutching device. The planetary gear arrangement has a portion drivingly engaged with the input portion. The continuously variable variator includes a portion which is drivingly engaged with at least one of the planetary gear arrangement and the input portion. The clutching device may be selectively drivingly engaged with a portion of the continuously variable variator. The clutching device and the planetary gear arrangement facilitate a transition between at least two operating modes of the continuously variable variator.

Various aspects of this invention will become apparent to those skilled in the art from the following detailed description of the preferred embodiment, when read in light of the accompanying drawings.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
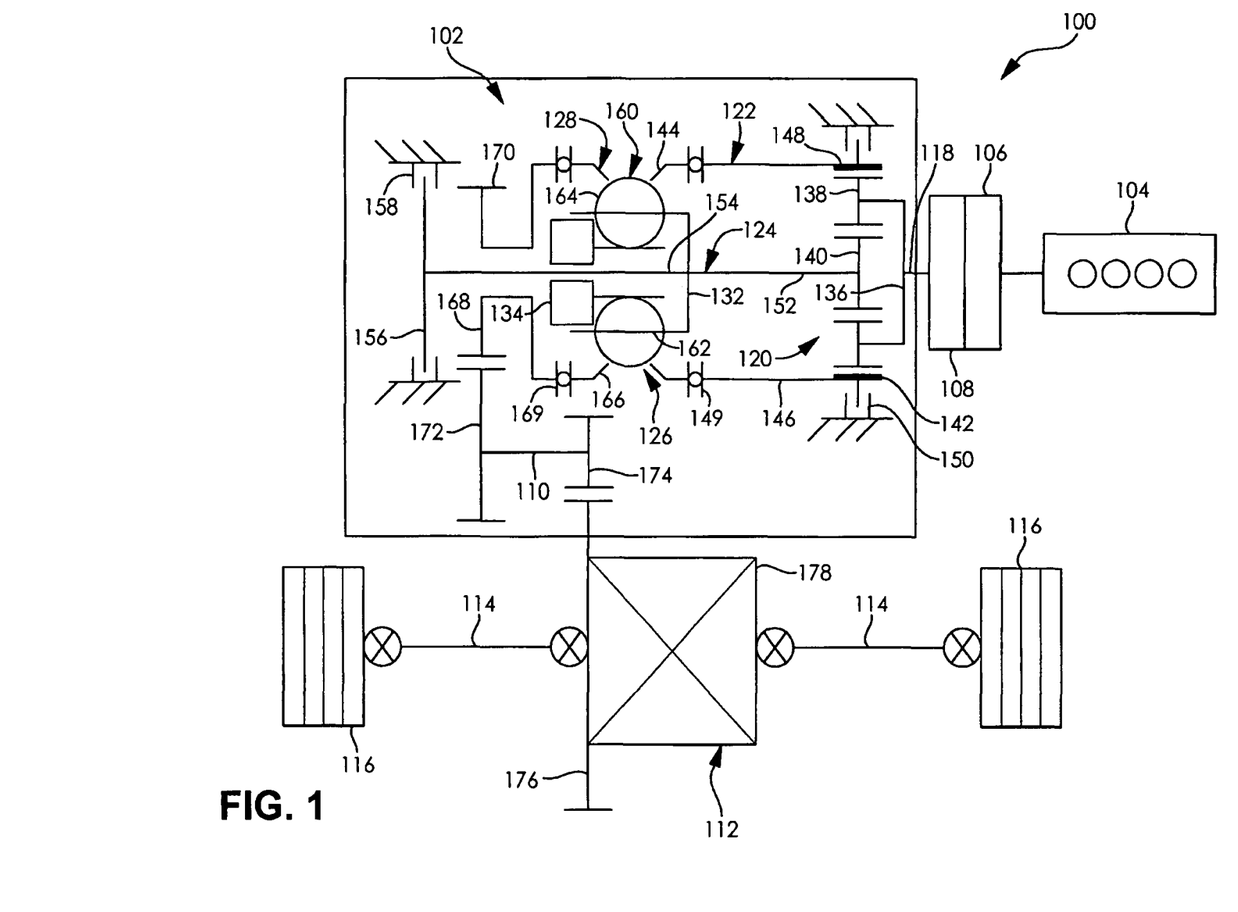
FIG. 1 is a schematic view of a transmission according to an embodiment of the invention.

FIG. 1 illustrates a driveline 100 including a continuously variable transmission 102. The driveline 100 comprises a power source 104, a damper 106, a primary clutch 108, the continuously variable transmission 102, an output 110, a differential 112, and a pair of output shafts 114 drivingly engaged with wheels 116. The power source 104 is drivingly engaged with the continuously variable transmission 102 through the damper 106 and the primary clutch 108. The continuously variable transmission 102 is drivingly engaged with the output 110 and the differential 112. The differential 112 is engaged with the pair of output shafts 114.

The power source 104 applies power to the continuously variable transmission 102 through the damper 106 and the primary clutch 108. The power source 104 is, for example, an internal combustion engine; however, it is understood that the power source 104 may include an electric motor or another source of rotational output. It is understood that the power source 104 may be a hybrid power source including both an internal combustion engine and an electric motor. Further, it is understood that the power source 104 may include an output ratio adjusting device as known in the art.

The damper 106 is a torsional damper as known in the art. The damper 106 is disposed between and in driving engagement with the power source 104 and a portion of the primary clutch 108 to reduce vibration and torque peaks.

The primary clutch 108 is disposed between the damper 106 and a portion of the continuously variable transmission 102. The primary clutch 108 facilitates variable driving engagement between the power source 104 and a portion of the continuously variable transmission 102; however, it is understood the primary clutch 108 may be substituted with any clutching device that permits selective engagement between the power source 104 and a portion of the continuously variable transmission 102. As non-limiting examples, the primary clutch 108 may comprise a plurality of intermeshed plates, a cone clutch, or another style of clutch that may be variably engaged. Further, it is understood that in embodiments of the invention not shown, the primary clutch 108 may be removed from the driveline, and the damper may be directly drivingly engaged with the continuously variable transmission 102.

The continuously variable transmission 102 is a tilting ball variator continuously variable transmission. The continuously variable transmission 102 comprises an input 118, a planetary gearset 120, a first drive ring 122, a variator shaft 124, a plurality of variator ball assemblies 126, and a second drive ring 128. The planetary gearset 120, the first drive ring 122, the variator shaft 124, the plurality of variator ball assemblies 126, and the second drive ring 128 are rotatably mounted in a transmission housing 130. A volume of the transmission housing 130 between the first drive ring 122 and the second drive ring 128 may be filled with one of a traction fluid and an automatic transmission fluid. Portions of the planetary gearset 120 are drivingly engaged with the input 118, the first drive ring 122, and the variator shaft 124. Each of the variator ball assemblies 126 is tiltably disposed on and drivingly engaged with a variator ball carrier 132 coupled to the variator shaft 124. A portion of each of the variator ball assemblies 126 contacts the first drive ring 122 and the second drive ring 128. An actuator assembly 134 disposed within the transmission housing 130 adjusts a position of the plurality of variator ball assemblies 126 between the first drive ring 122 and the second drive ring 128.

The input 118 is a member rotatably disposed in the transmission housing 130. The input 118 is drivingly engaged with the primary clutch 108 and a carrier 136 of the planetary gearset 120. As shown in FIG. 1, the input 118 is an elongate shaft; however, it is understood that the input 118 may be a gear or that a portion of the primary clutch 108 may be directly drivingly engaged with the carrier 136.

The planetary gearset 120 is an epicyclic gearset as known in the art. The planetary gearset 120 comprises the carrier 136, a plurality of planet gears 138, a sun gear 140, and a ring gear 142. The carrier 136, the sun gear 140, and the ring gear 142 are rotatably disposed in the transmission housing 130. Each of the planet gears 138 is rotatably disposed on the carrier 136 and is drivingly engaged with the sun gear 140 and the ring gear 142. The sun gear 140 is drivingly engaged with a first end of the variator shaft 124. The ring gear 142 is drivingly engaged with the first drive ring 122; however, it is understood that the ring gear 142 may be integrally formed with the first drive ring 122.

The first drive ring 122 is an annular member formed from a metal. The first drive ring 122 comprises an engagement end 144, a middle portion 146, and an input end 148. The first drive ring 122 is unitarily formed from a metal, however, it is understood that the first drive ring 122 may comprise a plurality of components coupled together in any conventional manner. As shown in FIG. 1, the first drive ring 122 may incorporate a ball ramp 149. The ball ramp 149 applies an axial thrust to the engagement end 144 when a torque is applied to the first drive ring 122.

The engagement end 144 defines an annular, conical surface that is configured to contact a portion of each of the variator ball assemblies 126. The engagement end 144 is one of in frictional engagement with or in rolling contact with the portion of each of the variator ball assemblies 126 contacting the engagement end 144, depending on a whether the first drive ring 122 or the variator ball carrier 132 is driven.

The middle portion 146 is a radially extending, substantially disk shaped portion of the first drive ring 122; however, it is understood that the middle portion 146 may have other shapes. The middle portion 146 may be coupled to the transmission housing 130 or another non-rotating component using a ring clutch 150. When engaged, the ring clutch 150 militates against rotation of the first drive ring 122 within the transmission housing 130. It is understood that the ring clutch 150 may be engaged in a variable manner, to facilitate a slipping condition of the ring clutch 150. As non-limiting examples, the ring clutch 150 may comprise a plurality of intermeshed plates (as shown in FIG. 1), a cone clutch, or another style of clutch that may be variably engaged.

The input end 148 is an axially extending, sleeve shaped portion of the first drive ring 122; however, it is understood that the input end 148 may have other shapes. An inner surface of the input end 148 is drivingly engaged with the ring gear 142, which facilitates driving engagement between the first drive ring 122 and each of the planet gears 138. Alternately, as mentioned hereinabove, it is understood that the ring gear 142 may be integrally formed with the first drive ring 122.

The variator shaft 124 is an elongate member formed from a metal. The variator shaft 124 comprises a first end 152 drivingly engaged with the sun gear 140, a middle portion 154 drivingly engaged with the variator ball carrier 132, and a second end 156. The variator shaft 124 is unitarily formed from a metal, however, it is understood that the variator shaft 124 may comprise a plurality of components coupled together in any conventional manner.

The second end 156 is a radially extending, substantially disk shaped portion of the variator shaft 124; however, it is understood that the second end 156 may have other shapes. The second end 156 may be coupled to the transmission housing 130 or another non-rotating component using a shaft clutch 158. When engaged, the shaft clutch 158 militates against rotation of the variator shaft 124 within the transmission housing 130. It is understood that the shaft clutch 158 may be engaged in a variable manner, to facilitate a slipping condition of the shaft clutch 158. As non-limiting examples, the shaft clutch 158 may comprise a plurality of intermeshed plates (as shown in FIG. 1), a cone clutch, or another style of clutch that may be variably engaged.

Each of the variator ball assemblies 126 includes at least a variator ball 160 and a variator axis 162, which are formed from a hardened metal. An outer surface 164 of each of the variator balls 160 is in contact with the engagement end 144 of the first drive ring 122 and an engagement end 166 of the second drive ring 128. The variator axis 162 is disposed through and coupled to the variator ball 160. The variator axis 162 is rotatably and tiltably coupled to the variator ball carrier 132. Alternately, the variator ball 160 may be rotatably coupled to the variator axis 162 and the variator axis 162 may be tiltably coupled to the variator ball carrier 132. The continuously variable transmission 102 includes at least three of the variator ball assemblies 126; however it is understood that the continuously variable transmission 102 may include more than three of the variator ball assemblies 126.

The second drive ring 128 is an annular member formed from a metal. The second drive ring 128 comprises the engagement end 166 and an output end 168. The second drive ring 128 is unitarily formed from a metal, however, it is understood that the second drive ring 128 may comprise a plurality of components coupled together in any conventional manner. As shown in FIG. 1, the second drive ring 128 may incorporate a ball ramp 169. The ball ramp 169 applies an axial thrust to the engagement end 166 when a torque is applied to the second drive ring 128.

The engagement end 166 defines an annular, conical surface that is configured to contact a portion of each of the variator ball assemblies 126. The engagement end 166 is in frictional engagement with the portion of each of the variator ball assemblies 126 contacting the engagement end 166.

The output end 168 is a radially extending, disc shaped portion of the second drive ring 128; however, it is understood that the output end 168 may have other shapes. An outer surface of the output end 168 includes a plurality of gear teeth formed therein, which define a drive gear 170 drivingly engaged with the output 110. Alternately, it is understood that the drive gear 170 may be formed separate from the second drive ring 128 and coupled thereto in any conventional manner.

The variator ball carrier 132 is a member coupled to the variator shaft 124 and extends radially therefrom. Each of the variator ball assemblies 126 is tiltably disposed on and drivingly engaged with a variator ball carrier 132. It is understood that the variator ball carrier 132 and the variator shaft 124 may be integrally formed The actuator assembly 134 is disposed adjacent the variator ball carrier 132 and adjusts a position of the plurality of variator ball assemblies 126 between the first drive ring 122 and the second drive ring 128. The plurality of variator ball assemblies 126 are simultaneously and similarly moved by the actuator assembly 134. As a non-limiting example, the actuator assembly 134 may be mechanically actuated by a member (not shown) disposed through a central perforation formed in one of the first drive ring 122 and the second drive ring 128 or through a central perforation formed through the variator shaft 124. Alternately, it is understood that the actuator assembly 134 may be hydraulically, electrically, or pneumatically actuated and that the actuator assembly 134 may be disposed outside of the transmission housing 130.

The output 110 is a member rotatably disposed in the transmission housing 130. The output 110 has a first geared end 172 drivingly engaged with the drive gear 170 of the second drive ring 128 and a second geared end 174 drivingly engaged with a crown gear 176 of the differential 112. As shown in FIG. 1, the output 110 comprises an elongate shaft; however, it is understood that the output 110 may be a gear or that a portion of the second drive ring 128 may be directly drivingly engaged with the crown gear 176.

The differential 112 comprises the crown gear 176 and a differential case 178. The components of the differential 112 are formed from a steel; however, it is understood that other rigid materials may be used to form the components of the differential 112. The differential 112 may be rotatably disposed in the transmission housing 130 or in a housing separate from the transmission housing 130. The crown gear 176 is coupled to the differential case 178 using a plurality of fasteners; however, it is understood that the crown gear 176 may be unitarily formed with the differential case 178.

The crown gear 176 is an annular member coupled to the differential case 178. The crown gear 176 comprises a plurality of teeth disposed about an outer diameter of the crown gear 176. The crown gear 176 is a helical gear which is drivingly engaged with the second geared end 174 of the output 110; however, it is understood that the crown gear 176 may be any type of gear.

The differential case 178 is a hollow member into which a pair of side gears (not shown) and at least two driving pinions (not shown) are rotatably disposed. The differential case 178 is conventional and well known in the art. The differential case 178 includes an outwardly extending flange which the crown gear 176 is coupled to. The axle half shafts are disposed in the differential case 178 and are respectively drivingly engaged with the side gears.

In use, the driveline 100 including the continuously variable transmission 102 facilitates adjusting an operating mode and a drive ratio of a vehicle the driveline 100 is incorporated in. The driveline 100 may be placed in a continuously variable operating mode and an infinitely variable operating mode. The operating mode of the driveline 100 may be adjusted automatically by a control system (not shown) of the vehicle or manually by an operator of the vehicle. The operating mode of the driveline 100 is determined by an engagement of the ring clutch 150 and the shaft clutch 158.

To place the driveline 100 in the continuously variable operating mode, the ring clutch 150 is placed in a disengaged condition and the shaft clutch 158 is placed in an engaged condition.

When the shaft clutch 158 is placed in the engaged condition, the variator shaft 124, the variator ball carrier 132, and the sun gear 140 are coupled to the transmission housing 130 through the shaft clutch 158. When the carrier 136 is driven by the power source 104, the first drive ring 122 is driven by the plurality of planet gears 138 through the ring gear 142, about the fixed sun gear 140.

Torque is applied to each of the variator balls 160 through the engagement end 144 of the first drive ring 122. Each of the variator balls 160 rotates about its respective variator axis 162, because the variator ball carrier 132 is fixed. In turn, each of the variator balls 160 transfers torque to the second drive ring 128 through the engagement end 166. The differential 112, and thus the pair of wheels 116, is driven by the second drive ring 128 through the output 110, which is drivingly engaged with the drive gear 170 of the second drive ring 128.

When the variator axis 162 of each of the variator balls 160 is adjusted by the actuator assembly 134, a gear ratio between the first drive ring 122 and the second drive ring 128 is adjusted. The gear ratio may be adjusted by the control system in response to a command by the operator of the vehicle.

To place the driveline 100 in the infinitely variable operating mode, the ring clutch 150 is placed in an engaged condition and the shaft clutch 158 is placed in a disengaged condition.

When the ring clutch 150 is placed in the disengaged condition, the first drive ring 122 is coupled to the transmission housing 130 through the ring clutch 150. When the carrier 136 is driven by the power source 104, the variator shaft 124 is driven by the plurality of planet gears 138 through the sun gear 140, within the ring gear 142.

Torque is applied to each of the variator ball assemblies 126 through variator ball carrier 132, which is coupled to the variator shaft 124. In response to the first drive ring 122 being fixed, each of the variator balls 160 rotates about its respective variator axis 162. In turn each of the variator balls 160 may transfers torque from the variator shaft 124 to the second drive ring 128 through the engagement end 166, depending on a position of the variator axis 162 of each of the variator balls 160. The differential 112, and thus the pair of wheels 116, may be driven by the second drive ring 128 through the output 110, which is drivingly engaged with the drive gear 170 of the second drive ring 128.

When the variator axis 162 of each of the variator balls 160 is adjusted by the actuator assembly 134, a gear ratio between the variator shaft 124 and the second drive ring 128 may be adjusted from a negative drive ratio to a positive drive ratio, through a neutral condition. The driveline 100 in the infinitely variable operating mode thus provides the vehicle with a forward mode, a neutral mode, and a reverse mode of operation. As illustrated in FIG. 1, the driveline 100 in the infinitely variable operating mode would be placed in the neutral mode. The gear ratio may be adjusted by the control system in response to a command by the operator of the vehicle.

An overall drive ratio of the driveline 100 including the continuously variable transmission 102 may be determined based on a ratio of the planetary gearset 120, a ratio of the continuously variable transmission 102, a ratio between the drive gear and the output 110, and a ratio between the output 110 and the differential 112.

A transition between the continuously variable operating mode and the infinitely variable operating mode may be performed by disengaging one of the ring clutch 150 and the shaft clutch 158 and engaging the remaining one of the ring clutch 150 and the shaft clutch 158. The driveline 100 including the continuously variable transmission 102 is able to continuously change the overall drive ratio of the vehicle to provide an optimized drive ratio for the power source 104, in view of an objective such as fuel consumption or power output of the vehicle.

Figure 2:
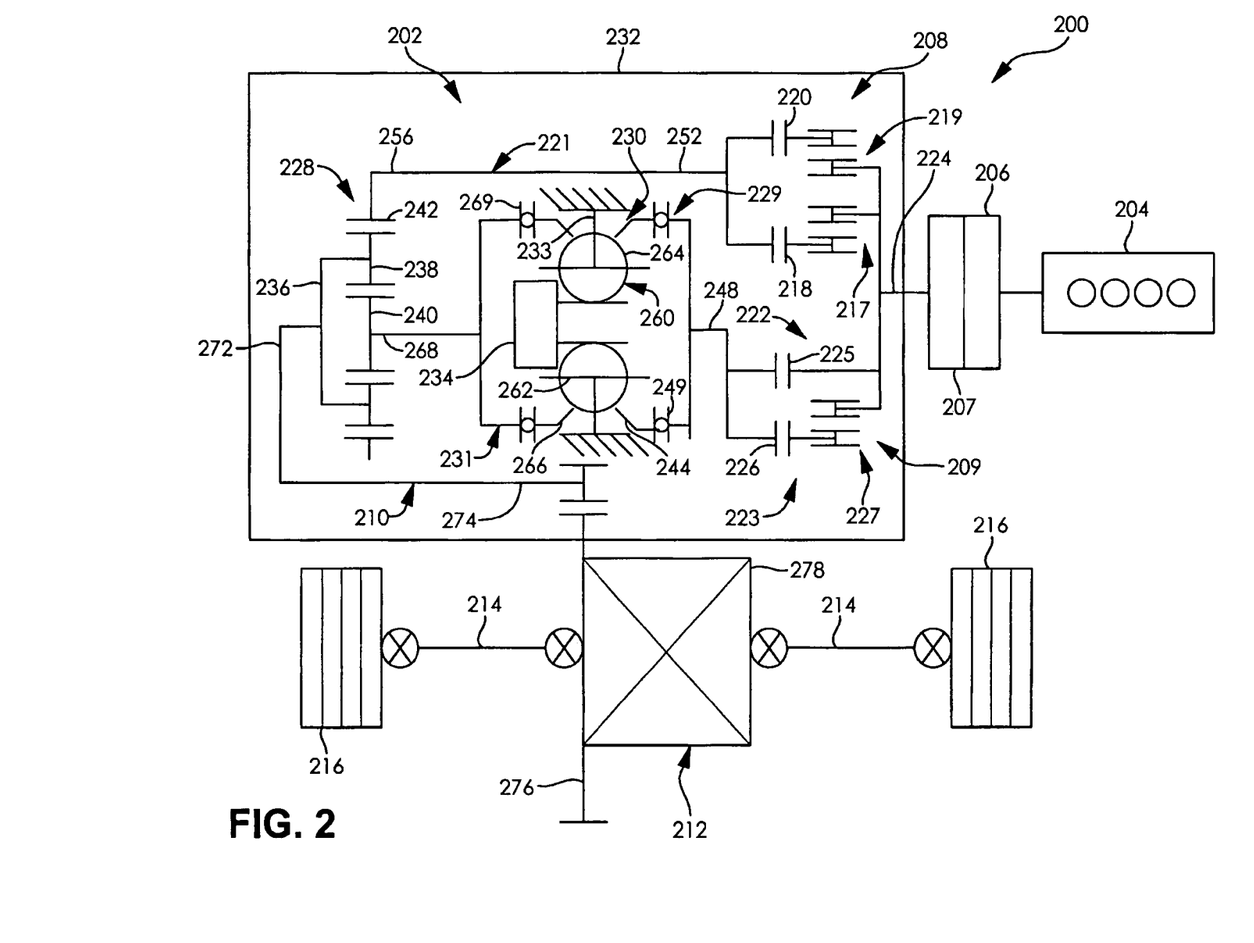
FIG. 2 is a schematic view of a transmission according to another embodiment of the invention.

FIG. 2 illustrates a driveline 200 including a continuously variable transmission 202 according to a second embodiment of the invention. The driveline 200 comprises a power source 204, a damper 206, a primary clutch 207, a speed selector 208, a directional selector 209, the continuously variable transmission 202, an output 210, a differential 212, and a pair of output shafts 214 drivingly engaged with wheels 216. The power source 204 is drivingly engaged with the speed selector 208 and the directional selector 209 through the damper 206 and the primary clutch 207. The speed selector 208 and the directional selector 209 are each drivingly engaged with a portion of the continuously variable transmission 202. The continuously variable transmission 202 is drivingly engaged with the output 210 and the differential 212. The differential 212 is engaged with the pair of output shafts 214.

The power source 204 applies power to the speed selector 208 and the directional selector 209 through the damper 206 and the primary clutch 207. The power source 204 is, for example, an internal combustion engine; however, it is understood that the power source 204 may include an electric motor or another source of rotational output. It is understood that the power source 204 may be a hybrid power source including both an internal combustion engine and an electric motor. Further, it is understood that the power source 204 may include an output ratio adjusting device as known in the art.

The damper 206 is a torsional damper as known in the art. The damper 206 is disposed between and in driving engagement with the power source 204 and a portion of the primary clutch 207 to reduce vibration and torque peaks.

The primary clutch 207 is disposed between the damper 206 and the speed selector 208 and the directional selector 209. The primary clutch 207 facilitates variable driving engagement between the power source 204 and the speed selector 208 and the directional selector 209; however, it is understood the primary clutch 207 may be substituted with any clutching device that permits selective engagement between the power source 204 and the speed selector 208 and the directional selector 209. As non-limiting examples, the primary clutch 207 may comprise a plurality of intermeshed plates, a cone clutch, or another style of clutch that may be variably engaged. Further, it is understood that in embodiments of the invention not shown, the primary clutch 207 may be removed from the driveline, and the damper may be directly drivingly engaged with the speed selector 208 and the directional selector 209.

The speed selector 208 is drivingly engaged with the primary clutch 207 and a portion of the continuously variable transmission 202. The speed selector 208 comprises an underdrive gearset 217, an underdrive clutch 218, an overdrive gearset 219, and an overdrive clutch 220. A portion of each of the underdrive gearset 217 and the overdrive gearset 219 are drivingly engaged with the primary clutch 207. A remaining portion of each of the underdrive gearset 217 and the overdrive gearset 219 are respectively drivingly engaged with a portion of the underdrive clutch 218 and the overdrive clutch 220. A remaining portion of the underdrive clutch 218 and the overdrive clutch 220 are each drivingly engaged with an intermediate shaft 221.

The underdrive gearset 217 comprises at least two gears which form a gear train to reduce a drive ratio between the primary clutch 207 and the intermediate shaft 221. The drive ratio between the primary clutch 207 and the intermediate shaft 221 is reduced when the underdrive clutch 218 is placed in an engaged position and the overdrive clutch 220 is placed in a disengaged position.

The underdrive clutch 218 is disposed between the underdrive gearset 217 and the intermediate shaft 221. The underdrive clutch 218 facilitates variable driving engagement between the power source 204 and the intermediate shaft 221 through the underdrive gearset 217; however, it is understood the underdrive clutch 218 may be substituted with any clutching device that permits selective engagement between the underdrive gearset 217 and the intermediate shaft 221. As non-limiting examples, the underdrive clutch 218 may comprise a plurality of intermeshed plates, a cone clutch, or another style of clutch that may be variably engaged.

The overdrive gearset 219 comprises at least two gears which form a gear train to increase a drive ratio between the primary clutch 207 and the intermediate shaft 221. The drive ratio between the primary clutch 207 and the intermediate shaft 221 is increased when the overdrive clutch 220 is placed in an engaged position and the underdrive clutch 218 is placed in a disengaged position.

The overdrive clutch 220 is disposed between the overdrive gearset 219 and the intermediate shaft 221. The overdrive clutch 220 facilitates variable driving engagement between the power source 204 and the intermediate shaft 221 through the overdrive gearset 219; however, it is understood the overdrive clutch 220 may be substituted with any clutching device that permits selective engagement between the overdrive gearset 219 and the intermediate shaft 221. As non-limiting examples, the overdrive clutch 220 may comprise a plurality of intermeshed plates, a cone clutch, or another style of clutch that may be variably engaged.

The directional selector 209 is drivingly engaged with the primary clutch 207 and a portion of the continuously variable transmission 202. The speed selector 208 comprises a forward assembly 222 and a reverse assembly 223. A portion of each of the forward assembly 222 and the reverse assembly 223 are drivingly engaged with the primary clutch 207. A remaining portion of each of the forward assembly 222 and the reverse assembly 223 are drivingly engaged with an input 224 of the continuously variable transmission 202.

The forward assembly 222 comprises at least a forward clutch 225 and is disposed between the primary clutch 207 and the input 224 of the continuously variable transmission 202. The forward assembly 222 facilitates variable driving engagement between the power source 204 and the input 224 through the forward clutch 225; however, it is understood the forward, clutch 225 may be substituted with any clutching device that permits selective engagement between the primary clutch 207 and the input 224. As non-limiting examples, the forward clutch 225 may comprise a plurality of intermeshed plates, a cone clutch, or another style of clutch that may be variably engaged.

The reverse assembly 223 comprises at least a reverse clutch 226 and a reverse gearset 227 disposed between the primary clutch 207 and the input 224 of the continuously variable transmission 202. The reverse assembly 223 facilitates variable driving engagement between the power source 204 and the input 224 through the reverse clutch 226 and a reversal of a rotational direction between the primary clutch 207 and the input 224. Further, it is understood the reverse clutch 226 may be substituted with any clutching device that permits selective engagement between the primary clutch 207 and the input 224. As non-limiting examples, the reverse clutch 226 may comprise a plurality of intermeshed plates, a cone clutch, or another style of clutch that may be variably engaged.

The continuously variable transmission 202 is a tilting ball variator continuously variable transmission. The continuously variable transmission 202 comprises the input 224, a planetary gearset 228, a first drive ring 229, a plurality of variator ball assemblies 230, and a second drive ring 231. The planetary gearset 228, the first drive ring 229, the plurality of variator ball assemblies 230, and the second drive ring 231 are rotatably mounted in a transmission housing 232. A volume of the transmission housing 232 between the first drive ring 229 and the second drive ring 231 may be filled with one of a traction fluid and an automatic transmission fluid. Portions of the planetary gearset 228 are drivingly engaged with a portion of the speed selector 208, the second drive ring 231, and the output 210. Each of the variator ball assemblies 230 is tiltably disposed on and drivingly engaged with a variator ball carrier 233 coupled to the transmission housing 232 or another non-rotating component. A portion of each of the variator ball assemblies 230 contacts the first drive ring 229 and the second drive ring 231. An actuator assembly 234 disposed within the transmission housing 232 adjusts a position of the plurality of variator ball assemblies 230 between the first drive ring 229 and the second drive ring 231.

The input 224 is a member rotatably disposed in the transmission housing 232. The input 224 is drivingly engaged with a portion of the directional selector 209 and the first drive ring 229. As shown in FIG. 2, the input 224 is a shaft; however, it is understood that the input 224 may comprise at least one gear, a plurality of shafts, or that a portion of the directional selector 209 may be directly drivingly engaged with the first drive ring 229.

The planetary gearset 228 is an epicyclic gearset as known in the art. The planetary gearset 228 comprises the carrier 236, a plurality of planet gears 238, a sun gear 240, and a ring gear 242. The carrier 236, the sun gear 240, and the ring gear 242 are rotatably disposed in the transmission housing 232. Each of the planet gears 238 is rotatably disposed on the carrier 236 and is drivingly engaged with the sun gear 240 and the ring gear 242. The sun gear 240 is drivingly engaged with second drive ring 231. The ring gear 242 is drivingly engaged with a portion of the speed selector 208.

The first drive ring 229 is an annular member formed from a metal. The first drive ring 229 comprises an engagement end 244 and an input end 248. The first drive ring 229 is unitarily formed from a metal, however, it is understood that the first drive ring 229 may comprise a plurality of components coupled together in any conventional manner. As shown in FIG. 2, the first drive ring 229 may incorporate a ball ramp 249. The ball ramp 249 applies an axial thrust to the engagement end 244 when a torque is applied to the first drive ring 229.

The engagement end 244 defines an annular, conical surface that is configured to contact a portion of each of the variator ball assemblies 230. The engagement end 244 is in frictional engagement with the portion of each of the variator ball assemblies 230 contacting the engagement end 244.

The input end 248 is an axially extending shaft of the first drive ring 229; however, it is understood that the input end 248 may have other shapes. The input end 248 is drivingly engaged with the directional selector 209, which facilitates driving engagement between the primary clutch 207 and the first drive ring 229. The input end 248 is integrally formed with the first drive ring 229; however, it is understood that the input end 248 may be formed separate from a remaining portion of the first drive ring 229 and coupled thereto in any conventional manner.

The intermediate shaft 224 is an elongate member formed from a metal. The intermediate shaft 224 comprises a first end 252 drivingly engaged with the speed selector 208 and a second end 256 drivingly engaged with the ring gear 242 of the planetary gearset 228. The ring gear 242 is formed separate from the intermediate shaft 224 and coupled thereto in any conventional manner; however, it is understood that the ring gear 242 may be integrally formed with the intermediate shaft 224. The intermediate shaft 224 is unitarily formed from a metal, however, it is understood that the intermediate shaft 224 may comprise a plurality of components coupled together in any conventional manner.

Each of the variator ball assemblies 230 includes at least a variator ball 260 and a variator axis 262, which are formed from a hardened metal. An outer surface 264 of each of the variator balls 260 is in contact with the engagement end 244 of the first drive ring 229 and an engagement end 266 of the second drive ring 231. The variator axis 262 is disposed through and coupled to the variator ball 260. The variator axis 262 is rotatably and tiltably coupled to the variator ball carrier 233. Alternately, the variator ball 260 may be rotatably coupled to the variator axis 262 and the variator axis 262 may be tiltably coupled to the variator ball carrier 233. The continuously variable transmission 202 includes at least three of the variator ball assemblies 230; however it is understood that the continuously variable transmission 202 may include more than three of the variator ball assemblies 230.

The second drive ring 231 is an annular member formed from a metal. The second drive ring 231 comprises the engagement end 266 and an output end 268. The second drive ring 231 is unitarily formed from a metal, however, it is understood that the second drive ring 231 may comprise a plurality of components coupled together in any conventional manner. As shown in FIG. 2, the second drive ring 231 may incorporate a ball ramp 269. The ball ramp 269 applies an axial thrust to the engagement end 266 when a torque is applied to the second drive ring 231.

The engagement end 266 defines an annular, conical surface that is configured to contact a portion of each of the variator ball assemblies 230. The engagement end 266 is one of in frictional engagement with or in rolling contact with the portion of each of the variator ball assemblies 230 contacting the engagement end 266, depending on a position of the variator ball assemblies 230.

The output end 268 is an axially extending shaft of the second drive ring 231; however, it is understood that the output end 268 may have other shapes. The output end 268 is drivingly engaged with the sun gear 240 of the planetary gearset 228, which facilitates driving engagement between the continuous variable transmission 202 and the output 210. The output end 268 is integrally formed with the second drive ring 231; however, it is understood that the output end 268 may be formed separate from a remaining portion of the second drive ring 231 and coupled thereto in any conventional manner.

The variator ball carrier 233 is a member non-rotatably coupled to the transmission housing 232 through a radially extending portion thereof. Each of the variator ball assemblies 230 is tiltably disposed on and drivingly engaged with a variator ball carrier 233.

The actuator assembly 234 is disposed adjacent the variator ball carrier 233 and adjusts a position of the plurality of variator ball assemblies 230 between the first drive ring 229 and the second drive ring 231. The plurality of variator ball assemblies 230 are simultaneously and similarly moved by the actuator assembly 234. As a non-limiting example, the actuator assembly 234 may be mechanically actuated by a member (not shown) disposed through a central perforation formed in one of the first drive ring 229 and the second drive ring 231. Alternately, it is understood that the actuator assembly 234 may be hydraulically, electrically, or pneumatically actuated and that the actuator assembly 234 may be disposed outside of the transmission housing 232.

The output 210 is an elongate member rotatably disposed in the transmission housing 232. The output 210 has a first end 272 drivingly engaged with the carrier 236 of the planetary gearset 228 and a second end 274 drivingly engaged with a crown gear 276 of the differential 212. The second end 274 comprises a plurality of gear teeth which form a gear. The second end 274 is integrally formed with the output 210; however, it is understood that the second end 274 may be formed separate from the output 210 and coupled thereto in any conventional manner. As shown in FIG. 2, the output 210 comprises an elongate shaft; however, it is understood that the output 210 may be a gear or that a portion of the carrier 236 may be directly drivingly engaged with the crown gear 276.

The differential 212 comprises the crown gear 276 and a differential case 278. The components of the differential 212 are formed from a steel; however, it is understood that other rigid materials may be used to form the components of the differential 212. The differential 212 may be rotatably disposed in the transmission housing 232 or in a housing separate from the transmission housing 232. The crown gear 276 is coupled to the differential case 278 using a plurality of fasteners; however, it is understood that the crown gear 276 may be unitarily formed with the differential case 278.

The crown gear 276 is an annular member coupled to the differential case 278. The crown gear 276 comprises a plurality of teeth disposed about an outer diameter of the crown gear 276. The crown gear 276 is a helical gear which is drivingly engaged with the second end 274 of the output 210; however, it is understood that the crown gear 276 may be any type of gear.

The differential case 278 is a hollow member into which a pair of side gears (not shown) and at least two driving pinions (not shown) are rotatably disposed. The differential case 278 is conventional and well known in the art. The differential case 278 includes an outwardly extending flange which the crown, gear 276 is coupled to. The axle half shafts are disposed in the differential case 278 and are respectively drivingly engaged with the side gears.

In use, the driveline 200 including the continuously variable transmission 202 facilitates adjusting an operating mode and a drive ratio of a vehicle the driveline 200 is incorporated in. The driveline 200 may be placed in an underdrive forward continuously variable operating mode, an overdrive forward continuously variable operating mode, an underdrive reverse continuously variable operating mode, and an overdrive reverse continuously variable operating mode. The operating mode of the driveline 200 may be adjusted automatically by a control system (not shown) of the vehicle or manually by an operator of the vehicle. The operating mode of the driveline 200 is determined by an engagement of the underdrive clutch 218, the overdrive clutch 220, the forward clutch 225, and the reverse clutch 226.

To place the driveline 200 in the underdrive forward continuously variable operating mode, the underdrive clutch 218 is placed in an engaged condition and the forward clutch 225 is placed in an engaged condition. The overdrive clutch 220 and the reverse clutch 226 are placed in a disengaged condition.

When the underdrive clutch 218 is placed in an engaged condition, the ring gear 242 is driven in a similar rotational direction as the power source 204 through the underdrive clutch 218 and the underdrive gearset 217. A drive ratio between the power source 204 and the intermediate shaft 221 is reduced through the underdrive gearset 217.

When the forward clutch 225 is placed in the engaged condition, the first drive ring 229 is driven in a similar rotational direction as the power source 204 through the forward clutch 225. Torque is applied to each of the variator balls 260 through the engagement end 244 of the first drive ring 229. Each of the variator balls 260 rotates about its respective variator axis 262, because the variator ball carrier 233 is fixed. In turn, each of the variator balls 260 transfers torque to the second drive ring 231, and thus the sun gear 240 through the engagement end 266. When the variator axis 262 of each of the variator balls 260 is adjusted by the actuator assembly 234, a gear ratio between the first drive ring 229 and the second drive ring 231 is adjusted. The gear ratio may be adjusted by the control system in response to a command by the operator of the vehicle.

To place the driveline 200 in the overdrive forward continuously variable operating mode, the overdrive clutch 220 is placed in an engaged condition and the forward clutch 225 is placed in an engaged condition. The underdrive clutch 218 and the reverse clutch 226 are placed in a disengaged condition.

When the overdrive clutch 220 is placed in an engaged condition, the ring gear 242 is driven in a similar rotational direction as the power source 204 through the overdrive clutch 220 and the overdrive gearset 219. A drive ratio between the power source 204 and the intermediate shaft 221 is increased through the overdrive gearset 219.

The operation of the forward clutch 225 when the driveline 200 is placed in the overdrive forward continuously variable operating mode is identical to the operation of the forward clutch 225 when the driveline 200 is placed in the underdrive forward continuously variable operating mode as described hereinabove.

To place the driveline 200 in the underdrive reverse continuously variable operating mode, the underdrive clutch 218 is placed in an engaged condition and the reverse clutch 226 is placed in an engaged condition. The overdrive clutch 220 and the forward clutch 225 are placed in a disengaged condition.

The operation of the underdrive clutch 218 when the driveline 200 is placed in the underdrive reverse continuously variable operating mode is identical to the operation of the underdrive clutch 218 when the driveline 200 is placed in the underdrive forward continuously variable operating mode as described hereinabove.

When the reverse clutch 226 is placed in the engaged condition, the first drive ring 229 is driven in an opposite rotational direction as the power source 204 through the reverse clutch 226 and the reverse gearset 227. Torque is applied to each of the variator balls 260 through the engagement end 244 of the first drive ring 229. Each of the variator balls 260 rotates about its respective variator axis 262, because the variator ball carrier 233 is fixed. In turn, each of the variator balls 260 transfers torque to the second drive ring 231, and thus the sun gear 240 through the engagement end 266. When the variator axis 262 of each of the variator balls 260 is adjusted by the actuator assembly 234, a gear ratio between the first drive ring 229 and the second drive ring 231 is adjusted. The gear ratio may be adjusted by the control system in response to a command by the operator of the vehicle.

To place the driveline 200 in the overdrive reverse continuously variable operating mode, the overdrive clutch 220 is placed in an engaged condition and the reverse clutch 226 is placed in an engaged condition. The underdrive clutch 218 and the forward clutch 225 are placed in a disengaged condition.

The operation of the overdrive clutch 220 when the driveline 200 is placed in the overdrive reverse continuously variable operating mode is identical to the operation of the overdrive clutch 220 when the driveline 200 is placed in the overdrive forward continuously variable operating mode as described hereinabove.

The operation of the reverse clutch 226 when the driveline 200 is placed in the overdrive reverse continuously variable operating mode is identical to the operation of the reverse clutch 226 when the driveline 200 is placed in the underdrive reverse continuously variable operating mode as described hereinabove.

Figure 3:
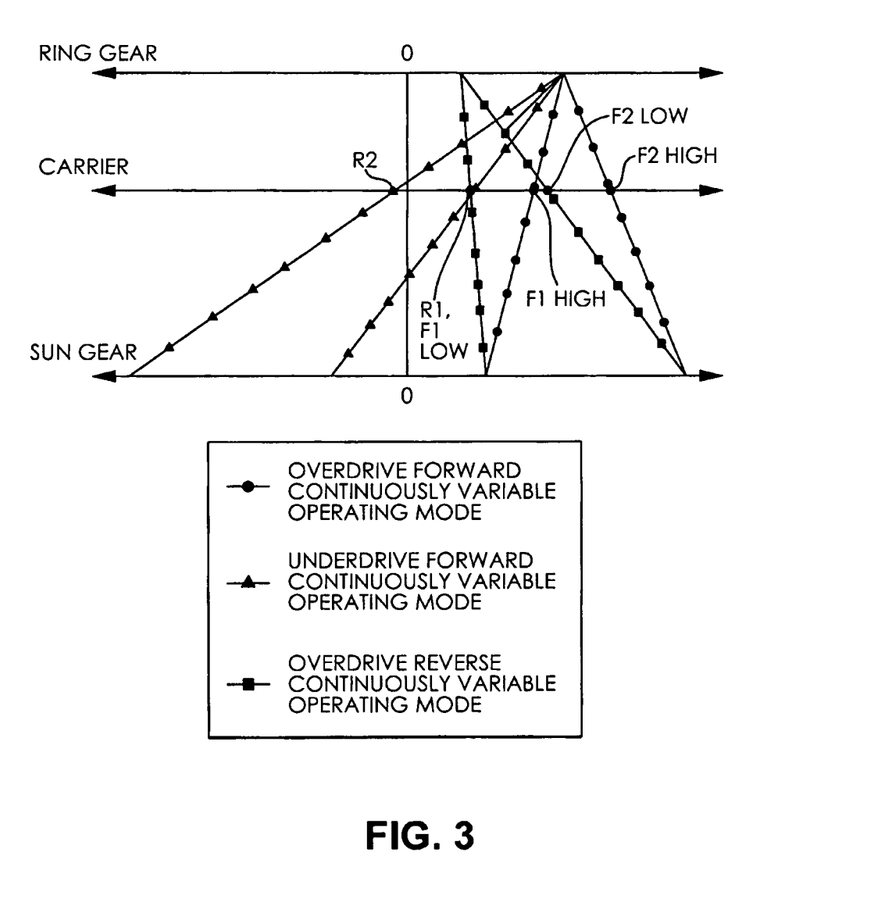
FIG. 3 is a speed diagram of a sun gear, a carrier, and a ring gear of the transmission illustrated in FIG. 2.

The planetary gearset 228 allows a torque applied to the intermediate shaft 221 and the output end 268 of the second drive ring 231 to be blended and applied to the first end 272 of the output 210. FIG. 3 is a speed diagram illustrating a rotational speed of the sun gear 240, the carrier 236, and the ring gear 242 when the driveline 200 is placed in the underdrive forward continuously variable operating mode, when the driveline 200 is placed in the overdrive forward continuously variable operating mode, and when the driveline 200 is placed in the overdrive reverse continuously variable operating mode.

The rotational speed of the sun gear 240, which is drivingly engaged with the the output end 268 of the second drive ring 231, is depicted as the lowermost horizontal axis shown in FIG. 3, wherein a positive rotational speed is shown on the right portion of the speed diagram and a negative rotational speed is shown on the left portion of the speed diagram. A rotational direction of the sun gear 240 changes depending on whether the forward clutch 225 or the reverse clutch 226 is engaged. The rotational speed of the sun gear 240 changes depending on the position of the variator axis 262 of each of the variator balls 260.

The rotational speed of the ring gear 242 is depicted as the uppermost horizontal axis shown in FIG. 3. The rotational speed of the ring gear 242 changes depending on whether the underdrive clutch 218 or the overdrive clutch 220 is engaged.

The rotational speed of the carrier 236 is depicted as the intermediate horizontal axis shown in FIG. 3. The rotational speed and a rotational direction of the carrier 236 is determined based on the rotational speed and the rotational direction of the sun gear 240 and the ring gear 242.

Accordingly, it is possible to adjust the rotational speed of the carrier 236 between the two values (R1 and R2, shown in FIG. 3) when the reverse clutch 226 and the overdrive clutch 220 are engaged by adjusting the position of the variator axis 262 of each of the variator balls 260. It is also possible to adjust the rotational speed of the carrier 236 between the two values (F1 and F2, shown in FIG. 3) when the forward clutch 225 and one of the underdrive clutch 218 and the overdrive clutch 220 are engaged by adjusting the position of the variator axis 262 of each of the variator balls 260.

Any of the operating modes illustrated in FIG. 3 may be selected depending on a driving condition the vehicle including the driveline 200 including the continuously variable transmission 202 encounters. As a non-limiting example, the overdrive forward continuously variable operating mode may be selected when the vehicle is travelling on a highway, such as when the vehicle is traveling at a cruising speed. The overdrive reverse continuously variable operating mode may be selected when the vehicle is traveling at a low or a reverse speed, such as when the vehicle is maneuvering. A selection of the operating mode may be automatically controlled through the use of the control system or the selection may be controlled by the operator of the vehicle.

Further, it is understood that when the operator is in any of the operating modes, the continuously variable transmission 20 may be configured to finely adjust a speed of the power source 204 to optimize a fuel consumption of the vehicle. A change from one operating mode to another operating mode be made at a given speed of the power source 204, which results in a very smooth shifting process.

A speed range of any of the operating modes may be adapted by selecting a specific gear ratio for the underdrive gearset 217, the overdrive gearset 219, the forward clutch 225, the reverse clutch 226, or by adding an additional configuration (not shown). It is understood that the forward clutch 225 and the reverse clutch 226 may be configured to provide a gear ratio selected for a specific application. It is also understood that the underdrive gearset 217, the overdrive gearset 219, the forward clutch 225, and the reverse clutch 226 may also be selected based on an efficiency point of the continuously variable transmission 202 and the power source 204, or based on a predetermined cruising speed.

As a result of the speed selector 208 and the planetary gearset 228, it is understood that the continuously variable transmission 202 may be of a reduced capacity design, as only a portion of the power of the power source 204 is applied to the continuously variable transmission 202.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A continuously variable transmission comprising:
   an input portion drivingly engaged with a power source;
   a planetary gear arrangement comprising:
     a carrier,
     a plurality of planet gears,
     a sun gear, and
     a ring gear, wherein the carrier is drivingly engaged with the input portion;
   a continuously variable tilting ball variator comprising:
     a first drive ring,
     a plurality of variator ball assemblies each assembly having a variator ball and variator axis, tiltably disposed on and drivingly engaged with a variator ball carrier coupled to a variator shaft,
     the variator shaft, and
     a second drive ring, wherein the variator is drivingly engaged with the planetary gear arrangement and the input portion; and
   a first clutching device configured to be selectively drivingly engaged with a portion of the continuously variable tilting ball variator, wherein the first clutching device and the planetary gear arrangement facilitate a transition between at least two operating modes of the continuously variable tilting ball variator.

2. The transmission according to claim 1, wherein the first clutching device is configured to be selectively drivingly engaged with one of the first drive ring and the second drive ring to militate against a rotation thereof.

3. The transmission according to claim 1, wherein the continuously variable tilting ball variator is configured to be operated in an infinitely variable operating mode.

4. The transmission according to claim 3, wherein the infinitely variable operating mode is engaged by engaging the first clutching device and disengaging a second clutching device.

5. The transmission according to claim 1, further comprising a directional selector drivingly engaged with the continuously variable tilting ball variator and the power source.

6. The transmission according to claim 1, further comprising a speed selector drivingly engaged with the planetary gear arrangement and the power source.

7. The transmission according to claim 1, wherein the planetary gear arrangement comprises the carrier drivingly engaged with the power source, the sun gear drivingly engaged with the continuously variable tilting ball variator, and the ring gear drivingly engaged with an output of the transmission.

8. The transmission according to claim 1, wherein the planetary gear arrangement comprises the carrier drivingly engaged with the power source, the sun gear drivingly engaged with the continuously variable tilting ball variator, and the ring gear which may be selectively drivingly engaged with the first clutching device to militate against a rotation thereof.

9. The transmission according to claim 1, further comprising a second clutching device which is configured to be selectively drivingly engaged with a portion of the planetary gear arrangement.

10. The transmission according to claim 1, further comprising an output of the continuously variable tilting ball variator and a shaft, wherein the output is drivingly engaged with the planetary gear arrangement and the shaft is drivingly engaged with the planetary gear arrangement and the input portion.

11. The transmission according to claim 1, wherein the continuously variable tilting ball variator is configured to be operated in the continuously variable operating mode by engaging a second clutching device and disengaging the first clutching device.

* * * * *